US009420106B1

(12) United States Patent
Thirugnanasundaram et al.

(10) Patent No.: US 9,420,106 B1
(45) Date of Patent: Aug. 16, 2016

(54) METHODS AND SYSTEMS FOR ASSIGNING PRIORITY TO INCOMING MESSAGE FROM CUSTOMER

(71) Applicant: XEROX CORPORATION, Norwalk, CT (US)

(72) Inventors: Veerasundaravel Thirugnanasundaram, Webster, NY (US); Tong Sun, Penfield, NY (US); Arun Bakthavachalu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/639,143

(22) Filed: Mar. 5, 2015

(51) Int. Cl.
*H04M 3/00* (2006.01)
*H04M 5/00* (2006.01)
*H04M 3/523* (2006.01)
*G06Q 50/00* (2012.01)

(52) U.S. Cl.
CPC ............. *H04M 3/5232* (2013.01); *G06Q 50/01* (2013.01)

(58) Field of Classification Search
CPC ................. H04M 2203/4545; H04M 2203/40; H04M 2203/407
USPC ............. 379/265.01, 265.13, 265.05, 265.11, 379/266.01
See application file for complete search history.

(56) References Cited

U.S. PATENT DOCUMENTS

| 7,606,714 | B2 | 10/2009 | Williams et al. |
| 7,941,491 | B2 | 5/2011 | Sood |
| 8,935,190 | B2 * | 1/2015 | Amoroso ............. G06Q 10/107 706/46 |
| 2013/0262320 | A1 * | 10/2013 | Makanawala ........... H04L 51/32 705/304 |

FOREIGN PATENT DOCUMENTS

WO      2013118089 A2    8/2013

* cited by examiner

*Primary Examiner* — Thjuan K Addy
(74) *Attorney, Agent, or Firm* — Philip E. Blair; Fleit Gibbons Gutman Bongini & Bianco P.L.

(57) ABSTRACT

What is disclosed is a customer relationship management system to help customer care agents prioritize a response to an incoming message. Historical conversations between customers and agents are retrieved. Each conversation has associated features and an assigned priority. Features are categorized into a plurality of categories. A priority is assigned to each category based on the features and the cumulative priority of all conversations in each category. Thereafter, an incoming message is received from a customer's computing device. Features are extracted from the incoming message. A determination is then made as to which of the categories this incoming message belongs based on this message's features. A priority is then assigned to the incoming message based on a priority assigned to the category which the incoming message belongs. The priority is then displayed for a customer agent so the agent can prioritize his/her response to that customer's incoming message.

10 Claims, 6 Drawing Sheets

METHODS AND SYSTEMS FOR ASSIGNING PRIORITY TO INCOMING MESSAGE FROM CUSTOMER

TECHNICAL FIELD

The presently disclosed embodiments are related, in general, to customer relationship management systems. More particularly, the presently disclosed embodiments are related to methods and systems for assigning a priority to an incoming message from a customer.

BACKGROUND

Customer relationship management (CRM) is widely implemented for managing a company's interactions with customers, clients, and sales prospects. The goal is to find, attract, and win new clients, nurture and retain the existing clients, entice former clients to return, and reduce the costs of marketing and client service. In Social CRM environment, the customers usually send their queries by means of messages to customer support representatives. A prompt reply to such messages may help the organizations to maintain and gain businesses.

The customers may utilize social medium channels such as FACEBOOK™ LINKEDIN™, TWITTER™, and the like to communicate with the customer care representatives. However, the social medium channels may be very noisy and informal. Hence, the identification of the high priority messages may be a very challenging task for organizations to maintain their communication with their customer.

SUMMARY

What is disclosed is a customer relationship management system to help customer care agents prioritize a response to an incoming message. Historical conversations between customers and agents are retrieved. Each conversation has associated features and an assigned priority. Features are categorized into a plurality of categories. A priority is assigned to each category based on the features and the cumulative priority of all conversations in each category. Thereafter, an incoming message is received from a customer's computing device. Features are extracted from the incoming message. A determination is then made as to which of the categories this incoming message belongs based on this message's features. A priority is then assigned to the incoming message based on a priority assigned to the category which the incoming message belongs. The priority is then displayed for a customer agent so the agent can prioritize his/her response to that customer's incoming message.

BRIEF DESCRIPTION OF DRAWINGS

The accompanying drawings illustrate the various embodiments of systems, methods, and other aspects of the teachings disclosed herein. Any person with ordinary skill in the art would appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
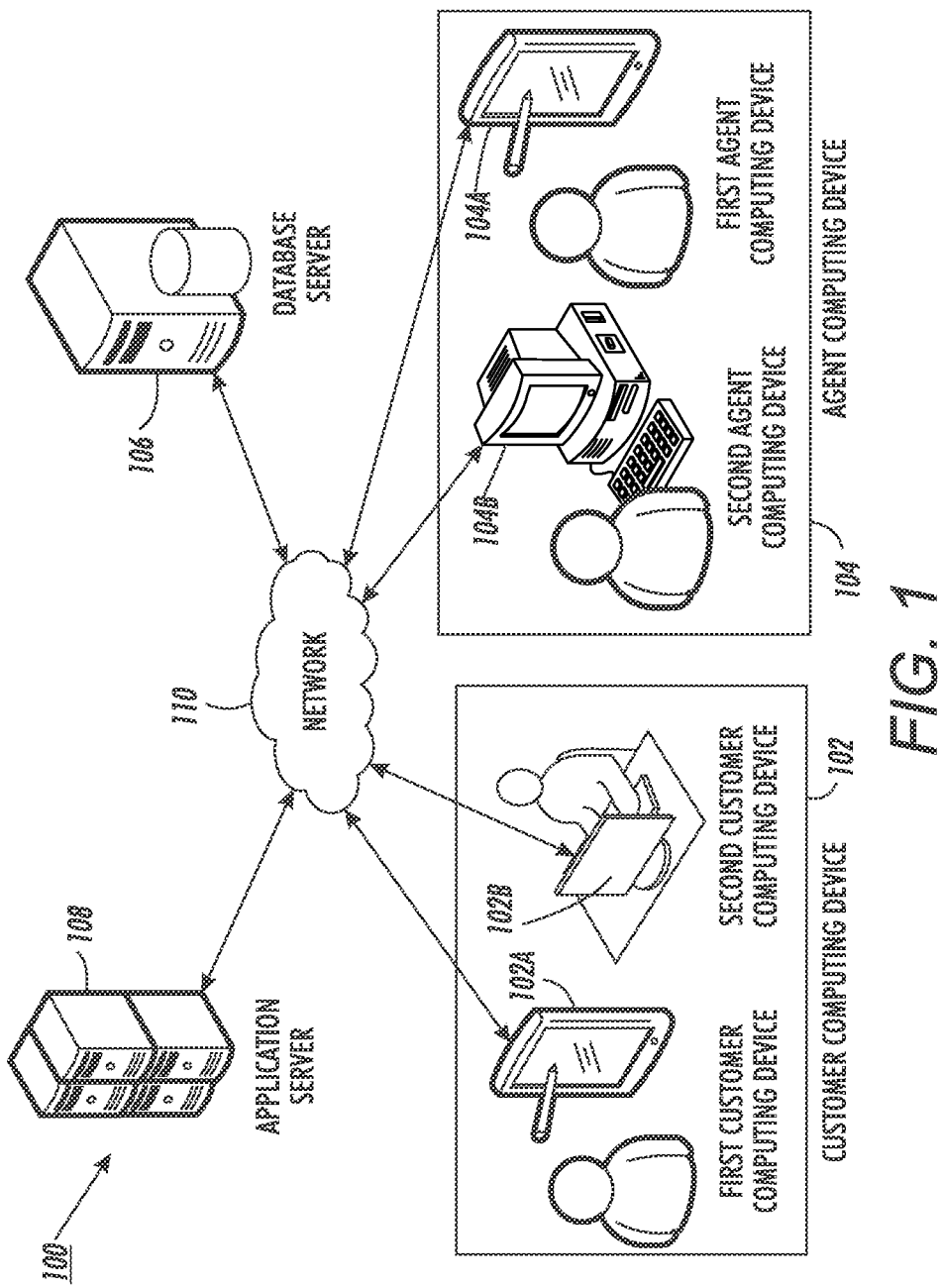
FIG. 1 is a block diagram of a system environment in which various embodiments can be implemented.

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation, but that not every embodiment or example necessarily includes that particular feature, structure, characteristic, property, element, or limitation. Further, repeated use of the phrase "in an embodiment" does not necessarily refer to the same embodiment.

DEFINITIONS

The following terms shall have, for the purposes of this application, the meanings set forth below.

A "computing device" refers to a device that includes processors/microcontrollers and/or any other electronic components, or a device or a system that performs operations according to programming instructions/codes. Examples of the computing device may include a desktop computer, a laptop, a personal digital assistant (PDA), a mobile device, a Smartphone, a tablet computer (e.g., iPad®, and Samsung Galaxy Tab®), and the like.

A "message" refer to a communication transmitted to or received for an individual who cannot be reached directly. The message may correspond to at least of an instant message conversation, an electronic mail, a voice mail, a text message, and a message corresponding to a query/problem. A "first message" refers to an incoming message from an individual pertaining to a query or problem. The individual may transmit the first message to a customer care agent for an appropriate solution pertaining to the first message. Hereinafter, "first message" and "incoming message" has been interchangeably used.

A "priority" refers to a fact or condition of being treated or regarded as more important than others. The priority may comprise ratings such as "high", "medium", "low," or "spam". The priority may comprise numerical values representing the ratings such as "1", "2", "3", or "4", wherein rating "1" may be assigned corresponding to a most important incoming message and rating "4" may be assigned corresponding to a least important incoming message, or vice versa.

A "first customer" refers to an individual who is a member of social CRM based companies/organizations. The first customer may transmit/send a first message, corresponding to a problem/query/issue, to a customer care agent for a solution.

A "second customer" refers to an individual who is a member of social CRM based companies/organizations. The second customer may have communicated, pertaining to queries/problems/issues, with customer care agents in the past. The conversation history comprising conversations between the second customer and the customer care agents may be stored in a storage system such as a database, cloud system, or work logs.

A "customer care agent" refers to an individual, a machine, or a software program which transmits responses corresponding to a query/issue/problem raised by a first customer. The customer care agent may be responsible for providing solutions or services to the first customer. Hereinafter, "customer care agent" and "agent" has been interchangeably used.

A "social customer relationship management (CRM)" system refers to a system responsible for maintaining and managing customer relations. Managing customer relations may involve managing interactions with the customers, and pitching for new customers. The CRM system may have defined workflows to manage the customer relations. The workflows may include workflows related to organize, automate and synchronize marketing, customer service, and technical support. Where the CRM system manages the interactions between the customer and the customer management agents, the CRM system manages timely and accurate responses to the incoming messages (i.e., first messages), providing the solutions to each of first customers' requirements, timely communications with the first customers, and customer service centers utilized for solving issues/queries of the first customers.

"Historical conversations" refer to previous conversations between second customers and customer care agents. The historical conversations may comprise one or more second messages that may have been communicated between a second customer and a customer care agent.

"One or more features" refer to features associated with each of the conversations in the historical conversations. The features may comprise at least of a sentiment of a message in a conversation, a topic of the conversation, a location of a customer, or a social media influence of the customer. The message may correspond to a first message or a second message. The conversation may correspond to a previous conversation or present conversation. Further, the customer may correspond to a first customer or second customer.

"One or more combinations of features" refer to all possible combination of feature values obtained from the conversations/messages. For example, there are three features (e.g., location, topic, and influence) extracted from a historical conversation. Each of the three features may have different values. For example, the feature location may have various values such as location-1, location-2, and location-3.

Similarly, values of the influence features may include high, medium, and low. The combinations may correspond to all possible combinations of the feature values, for example, {location-1, influence(high)}, {location-1, influence(low)}, {location-1, influence(medium)}, {location-1, influence(medium), topic-1}, and so on.

A "first set of rules" refers to a set of rules (i.e., a set of dynamic workflow rules) that may be utilized for assigning a priority to an incoming message (i.e., a first message). The first set of rules are determined/generated based on the historical conversations and the combinations of features extracted from each of the historical conversations.

"One or more predefined rules" refer to a set of rules (i.e., a set of static workflow rules) being utilized for assigning a priority to an incoming message based on recent conversations, customer influence, location, or topic of message. Further, the predefined rules require manual analysis of the messages for assigning the priority to an incoming message. For example, if an issue comes from a high influencing customer about a bad network then a high priority will be assigned, but the same issue raised by a low influencing customer will be considered as a low priority.

"One or more predefined priorities" refer to priorities that have been previously assigned to each of conversations in historical conversations. The customer care agents may have assigned a priority to each conversation in the historical conversations based on predefined rules such as recent conversations, rules on the customer influence score, rules on the location of the customer, or rules related to the topic of message.

A "first response time" refers to a time taken by a second customer to reply to each of messages received from customer care agents. For example, a customer care agent sent a message to a second customer at 10.30 AM. The second customer replied at 10.35 AM. Therefore, the first response time is 5 minutes.

A "second response time" refers to a time taken by a customer care agent to reply to each of messages received from a second customer. For example, a second customer sent a message to a customer care agent at 10.40 AM. The customer care agent replied at 10.42 AM. Therefore, the second response time is 2 minutes.

Functional Block Diagram

FIG. 1 is a block diagram of a system environment 100, in which various embodiments can be implemented. The system environment includes a customer computing device 102 such as a first customer computing device 102A and a second customer computing device 102B, an agent computing device 104 such as a first agent computing device 104A and a second agent computing device 104B, a database server 106, an application server 108, and a network 110. Various devices in the system environment may be interconnected over the network. FIG. 1 shows, for simplicity, two customer computing devices 102A and 102B, two agent computing devices 104A and 104B, one database server 106, and one application server 108. However, it will be apparent to a person having ordinary skill in the art that the disclosed embodiments may also be implemented using multiple customer computing devices 102, multiple agent computing devices 104, multiple database servers 106, and multiple application servers 108.

The customer computing device may correspond to a computing device that may be used by a first customer. The first customer may correspond to an individual who may transmit a first message, corresponding to a problem/query/issue, to a customer care agent for a solution. The customer computing device may comprise processors in communication with memories. The customer computing device may be operable to execute sets of instructions stored in the memories. The customer computing device may be communicatively coupled to the network. The customer computing device may comprise a display screen that may be configured to display one or more user interfaces to the first customer. The first customer may utilize the customer computing device to transmit the first message corresponding to a problem/query/issue to the agent computing device 104, the database server, and/or the application server over the network. For example, a first customer may transmit a first message such as "my mobile data is not is not getting backed up". The first customer may utilize the customer computing device to receive/view one or more responses pertaining to the first message. For example, a customer care agent may send a second message in response to the first message such as, "I can help you, please share your area zip code".

The customer computing device may correspond to various types of computing devices such as a desktop computer, a laptop, a personal digital assistant (PDA), a mobile device, a smartphone, a tablet computer (e.g., iPad® and Samsung Galaxy Tab®), and the like.

The agent computing device 104 may correspond to a computing device used by agents. The agents may correspond to one or more customer care agents/individuals/persons/users, who may transmit responses corresponding to first messages. The agent computing device may comprise processors in communication with memories. The agent computing device may be operable to execute sets of instructions stored in the memories. The agent computing device may be communicatively coupled to the network. The agent computing device 104 may comprise a display screen that may be configured to display user interfaces to the agents. The agents may utilize the agent computing device to receive/view the first message from the customer computing device, the database server, and/or the application server over the network. For example, a first customer may transmit a first message such as "my mobile data is not is not getting backed up". The agents may utilize the agent computing device to transmit one or more responses pertaining to the first message. For example, a customer care agent may send a second message in response to the first message such as, "I can help you, please share your area zip code". Further, the agents may utilize the agent computing device to assign a priority to the first message from the first customer based on at least of first features associated with the first message and the historical conversations associated with the first customer. The agent may utilize predefined rules or static rules to determine the priority of the first message. Manual assigning of a priority is described in conjunction with FIGS. 5A and 5B.

The agent computing device may correspond to various types of computing devices such as a desktop computer, a laptop, a personal digital assistant (PDA), a mobile device, a smartphone, a tablet computer (e.g., iPad® and Samsung Galaxy Tab®), and the like.

The database server may refers to a computing device or a storage system that may be configured to store historical conversations between second customers and the agents. The database server may obtain the historical conversations from various sources such as file systems, work logs, cloud systems, or databases of social CRM based companies/organizations (e.g., social networking websites such as FACEBOOK™, LINKEDIN™, TWITTER™, etc.) that may provide the rightful authentication to access the historical conversations. The historical conversations may comprise conversations that may have been communicated between the second customers and the agents. The database server may store metadata associated with each of the conversations in the historical conversations. The metadata may comprise features associated with each of the historical conversations, a timestamp associated with each of second messages in each of the conversations, combinations of the features, and priorities associated with each of the historical conversations. The features associated with each of the historical conversations may comprise at least of a sentiment of a message in a conversation, a topic of the conversation, a location of a second customer, or a social media influence of the second customer. The database server may store predefined rules that may be utilized to assign the priority to an incoming message such as the first message. The database server may store priorities assigned to incoming messages such as first messages. The social CRM based companies/organizations (e.g., FACEBOOK™, LINKEDIN™, TWITTER™, etc.) may store the conversations that have been previously communicated between the second customers and the agents in the central storage systems such as file systems, work logs, or cloud systems.

The database server may be communicatively coupled over the network. The database server may be configured to transmit or receive instructions/metadata/historical conversations/first messages to/from computing devices, such as the customer computing device and the application server over the network. The database server may receive a query from the application server to retrieve the information (e.g., the historical conversations, the metadata, the first message, etc.). For querying the database server, querying languages may be utilized such as SQL, QUEL, DMX and so forth. Further, the database server may be realized through various technologies such as Microsoft® SQL server, Oracle, and My SQL.

The application server may refer to a computing device or a software framework that may provide a generalized approach to create the application server implementation. The function of the application server may be dedicated to the efficient execution of procedures, such as programs, routines, or scripts stored in memories for supporting its applied applications. The application server may be configured to monitor the incoming messages (i.e., the first messages). The first messages posted by the first customers may be stored in the memories of the application server. The application server may be configured to send a query to the database server to extract the historical conversations between the second customers and the agents. The application server may send a query to the central storage systems to extract the historical conversations. Further, the application server may extract the features from each of the historical conversations. The features extracted from the historical conversations may comprise at least of the topic associated with each conversation, the sentiment of the conversation, the location of the second customer, or the social media influence of the second customer. The application server may determine the combinations based on at least the features extracted from each of the conversations. The application server may assign a priority to each combination based on at least a count of conversations in each of the predefined priorities (i.e., categories such as high, medium, low, and spam) associated with each combination. The application server may determine the first set of rules based on at least the priority assigned to each combination and a predefined priority of each conversation. Further, the application server may extract the predefined rules from the memories or the database server. Thereafter, the application server may update the predefined rules with the generated first set of rules. The application server utilizes at least the updated predefined rules to determine the priority of the first message. Further, the application server may utilize a combination of the first features associated with the first message to determine the priority of the first message.

The application server may present/display a user interface, on the display screen of the agent computing device, displaying assigned priority of the first message to the agents. A method of assigning the priority to the first message will be explained later in conjunction with FIG. 3 and FIG. 4. Further, the GUI displaying a ranked list of messages (i.e., a ranked list of incoming messages) based on assigned priorities will be explained later in conjunction with FIG. 5A and FIG. 5B.

The application server may be realized through various web-based technologies such as a Java web-framework, a .NET framework, a PHP framework, or any other web-application framework. The application server has been described later in conjunction with FIG. 2.

A person with ordinary skill in the art would understand that the scope of this disclosure is not limited to the agent computing device 104, the database server or the application server as a separate entity. The functionalities of the database server may be integrated into the agent computing device 104 and/or the application server.

The network corresponds to a medium through which conversations and messages (e.g., the conversations, metadata associated with the historical conversations, the first messages, etc.) flow between various devices of the system environment (e.g., the customer computing device 102, the agent computing device 104, the database server, and the application server). Examples of the network may include, but are not limited to, a Wireless Fidelity (Wi-Fi) network, a Wireless Area Network (WAN), a Local Area Network (LAN), or a Metropolitan Area Network (MAN). Various devices in the system environment can connect to the network in accordance with various wired and wireless communication protocols such as Transmission Control Protocol and Internet Protocol (TCP/IP), User Datagram Protocol (UDP), and 2G, 3G, or 4G communication protocols.

System for Assigning Priority to a First Message

Figure 2:
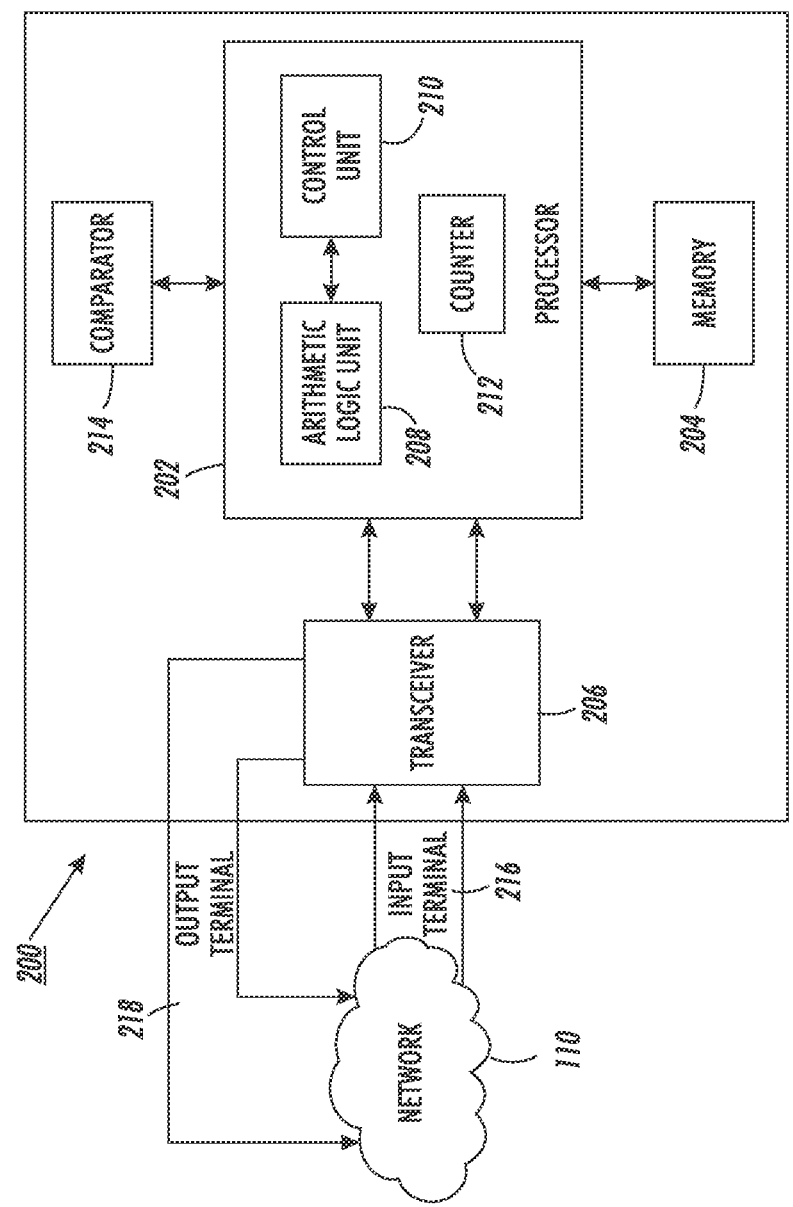
FIG. 2 is a block diagram that illustrates a system for assigning a priority to a first message from a first customer in a social CRM environment.

FIG. 2 is a block diagram illustrating a system 200 for assigning a priority to a first message from a first customer in a social CRM environment. The system may comprise processors, such as a processor 202, memories, such as a memory 204, transceivers, such as a transceiver 206, arithmetic logic units such as an arithmetic logic unit (ALU) 208, control units, such as a control unit 210, and comparators, such as a comparator 214. The transceiver is coupled with an input terminal 216 and an output terminal 218.

The system may correspond to the agent computing device 104 or the application server. For the purpose of the ongoing description, the system has been considered as the application server.

The processor may be configured to execute a set of instructions stored in the memory to perform operations. The processor may be coupled to the memory, the transceiver, and the comparator. The processor may comprise the ALU and the control unit. The ALU may be coupled to the control unit. The ALU may be operable to perform mathematical and logical operations and the control unit may control the operation of the ALU. Further, the processor may comprise counters such as a counter 212. Though, the counter is implemented within the processor in FIG. 2, a person skilled in the art would appreciate the counter to be implemented as independent from the processor. The processor may be implemented based on a number of processor technologies known in the art. Examples of the processor include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory may be operable to store machine codes, and/or computer programs having at least one code section executable by the processor. The memory may store at least sets of instructions, metadata associated with the historical conversations, and/or the first message. Some of the commonly known memory implementations include, but are not limited to, a random access memory (RAM), a read-only memory (ROM), a hard disk drive (HDD), and a secure digital (SD) card. The memory may include the machine codes, and/or computer programs that are executable by the processor to perform specific operations. It will be apparent to a person having ordinary skill in the art that the instructions stored in the memory enables the hardware of the system to perform the predetermined operation.

The transceiver may be operable to communicate with the devices, such as the customer computing device or the agent computing device 104 and/or servers, such as the database server over the network. The transceiver may be operable to transmit or receive the metadata/instructions/queries/first message/responses to/from various components of the system environment. The transceiver is coupled to the input terminal and the output terminal through which the transceiver may receive or transmit metadata/instructions/queries/first message/responses. The input terminal and the output terminal may be realized through an antenna, an Ethernet port, an USB port or any other port that can be configured to receive and transmit data. The transceiver may receive and transmit various data in accordance with various communication protocols such as, TCP/IP, UDP, and 2G, 3G, or 4G communication protocols through the input terminal and the output terminal, respectively.

The comparator is configured to compare at least two input signals to generate an output signal. The output signal may correspond to either '1' or '0'. The comparator may generate output '1' if the value of a first signal (from the at least two signals) is greater than a value of the second signal (from the at least two signals). Similarly, the comparator may generate an output '0' if the value of the first signal is less than the value of the second signal. The comparator may be realized through either software technologies or hardware technologies known in the art. Though, the comparator is depicted as independent from the processor in FIG. 2, a person skilled in the art would appreciate that the comparator may be implemented within the processor without departing from the scope of this disclosure.

In operation, the processor may receive the historical conversations from the database server. The processor may extract the features from each of the conversations in the historical conversations. Thereafter, the processor may determine the combinations of the features. Each combination of the features may correspond to first categories. Thereafter, the processor may categorize each of the conversations in the first categories (i.e., combinations of the features), as per the features associated with the conversations. Each of the first categories may include a first set of conversations. The categorization of the conversations in the first categories has been described later in conjunction with FIG. 3.

The processor may further categorize the first set of conversations in second categories based on the priority associated with each conversation in the first set of conversations. Each of the second categories corresponds to a priority associated with the conversation. For example, the second categories may correspond to a high priority, a medium priority, a low priority, and a spam priority.

Thereafter, the processor determines a priority of each of the first categories (i.e., the combinations of the features) based on the count of the conversations under each of the second categories in the respective first categories. As the first categories correspond to combinations of the features, the processor assigns the priority to each combination of the features. For example, there are 20 historical conversations associated with a combination (e.g., location-1+topic-1). Five historical conversations have been previously assigned a high priority, seven historical conversations have been previously assigned a medium priority, and eight historical conversations have been previously assigned a low priority. So, the combination has three second categories, namely high, medium, and low. The count of conversations under each second category i.e. high, medium, and low is five, seven, and eight respectively. The count of the conversations is maximum (i.e., eight) under the low category. Therefore, the processor may assign a low priority to the combination (i.e., location-1+topic-1). Similarly, the processor may assign the priority to each of the combinations of the features (i.e., the first categories).

Thereafter, the processor may generate a training data that may be utilized to determine the first set of rules. The training data may comprise at least of the features extracted from each conversation, the combinations of the features, and the determined priority of each of the first categories. Further, the processor may update the predefined rules with the first set of rules. The generation of the first set of rules and thereafter, the updating of the predefined rules has been described later in conjunction with FIG. 3.

Further, the processor may receive the first messages such as the first message from the first customer. The processor may extract the first features from the first message. Thereafter, the processor may determine the combination of the first features extracted from the first message. Further, the processor may utilize the updated predefined rules to assign the priority to the first message based on at least the combination of the first features associated with the first message.

Post determining the priority of the first message, the processor may display the priority of the first message, on the display screen of the agent computing device 104, to the agents. An agent, from the agents, may transmit a response corresponding to the first message based on the assigned priority. The priority of a first conversation comprising the first message, between the first customer and the agent, may remain same as that of the first message from the first customer. The agents may change the priority of the first conversation comprising the first message based on least of the first features extracted from the first conversation comprising the first message, a timespan associated with each of the first messages in the first conversation, and a previous conversation history of the first customer.

Flowchart for Assigning Priority to First Message

Figure 3:
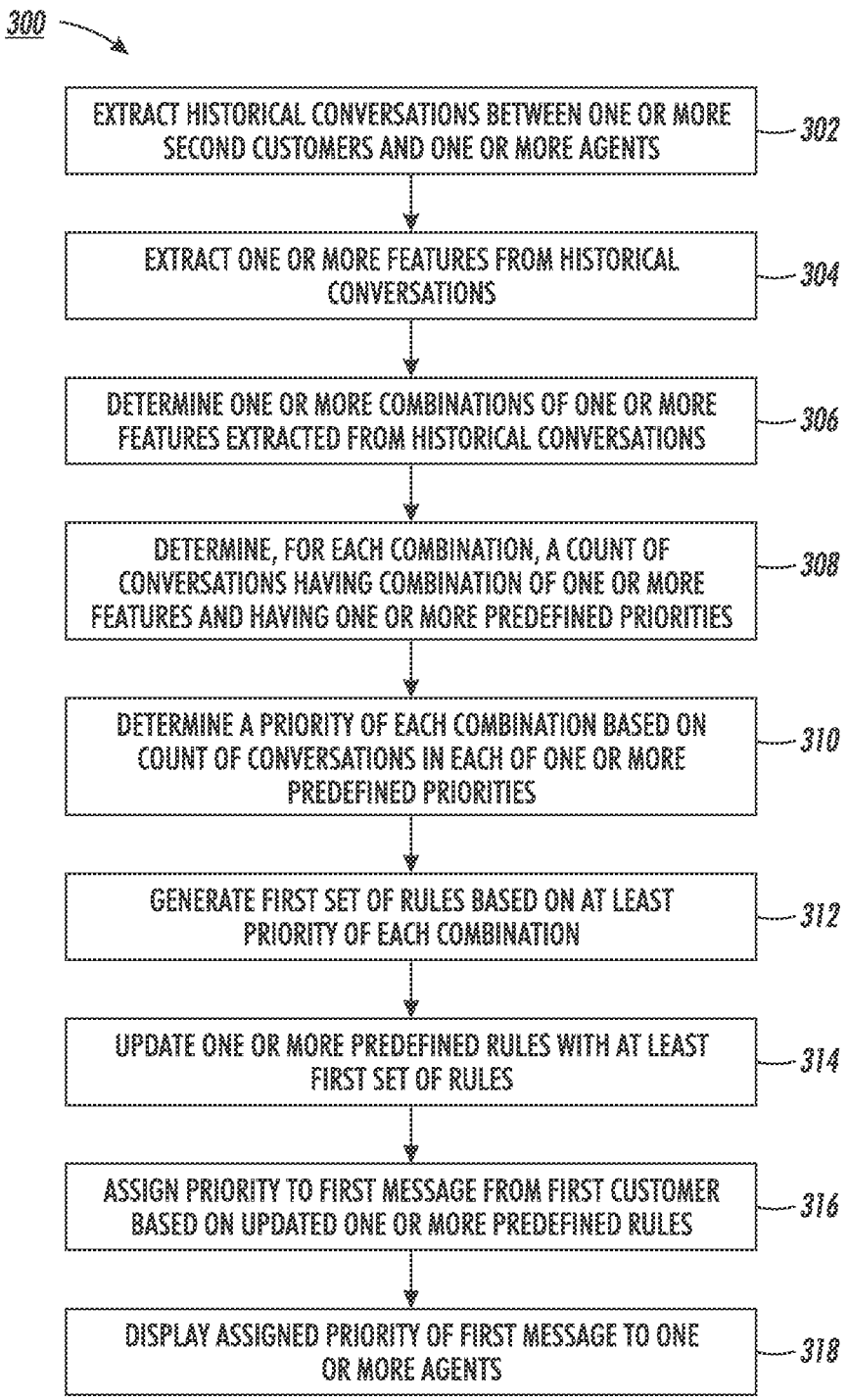
FIG. 3 is a flowchart illustrating a method for assigning a priority to a first message from a first customer in a social CRM environment.

FIG. 3 is a flowchart 300 illustrating the method for assigning the priority to the first message from the first customer. The flowchart 300 is described in conjunction with FIG. 1 and FIG. 2.

At step 302, the historical conversations between the second customers and the customer care agents (i.e., the agents) are extracted. The processor may send the query to the database server to extract the historical conversations. The historical conversations may comprise the conversations that may have occurred between the second customers and the agents. Each of the conversations may comprise the second messages. The conversations may comprise the features such as the locations of the second customers, the topic of the conversations, and the sentiments of the second messages in the conversations. Further, each of the conversations may be associated with the predefined priority that may have been assigned by the agents. The agent may have assigned a priority to each of the second messages in each conversation. Thereafter, the processor may have determined a cumulative priority of each conversation based on the priority of each of the second messages. For example, in a conversation there were 20 messages out of which 15 were high priority messages. Thus, the conversation is assigned a priority of high. The processor may determine the count of the messages in the conversation under each priority. Thereafter, the processor may determine the priority having maximum number of messages. The processor may assign the priority having maximum number of messages as the priority of the conversation.

The processor may send a query to the central storage systems of the companies/organizations/social networking platforms (e.g., social networking websites such as FACEBOOK™, LINKEDIN™, and TWITTER™) that may provide the rightful authentication to extract the historical conversations between the second customers and the agents. The central storage systems may comprise the file systems, the work logs, the cloud systems, and the databases of the companies/organizations/social networking platforms.

Further, the processor may extract the incoming message (i.e., the first message) that may have been stored in the database server. The processor may receive the first message from the customer computing device 102.

At step 304, the features are extracted from the historical conversations. The processor may extract the features from each of the conversations in the historical conversations. The features may comprise, but are not limited to, the topic associated with each conversation, the sentiment of the conversation, the location of the second customer, and the social media influence of the second customer. The processor may obtain the features for each of the conversations from the database server. For example, there are conversations. The processor may extract features from the conversations as shown in Table 1.

TABLE 1

An example of extracted features from conversations

| Conversations | Location | Customer's Influence | Topic |
|---|---|---|---|
| 12 | location-1 | influence(high) | topic-1 |
| 8 | location-2 | influence(high) | topic-2 |
| 9 | location-2 | influence(medium) | topic-1 |
| 15 | location-1 | influence(high) | topic-2 |
| 16 | location-1 | influence(low) | topic-1 |
| 13 | location-2 | influence(low) | topic-2 |
| 11 | location-2 | influence(low) | topic-1 |
| 16 | location-1 | influence(medium) | topic-2 |

As shown in Table 1, the features extracted from 12 conversations are location-1, influence(high), and topic-1. Similarly, the processor extracts features from each of the conversations in the historical conversations as shown in Table 1.

The processor may further extract the priority of the conversations from the database server. The agent may have assigned the priority to the conversation while interacting with the customer on the other side of the conversation.

Further, the processor may determine the priority of the conversation based on the response time of the messages in the conversations. The processor may determine the timestamp associated with the second messages in each of the conversations. Further, the processor may determine the priority of the conversations based on at least the timestamp associated with the second messages in each of the conversations. The ALU may determine a first response time and a second response time for each second message in each conversation based on at least the timestamp associated with each second message in each conversation. The first response time corresponds to a time taken by a second customer to reply to each of the second messages received from a customer care agent. The second response time corresponds to a time taken by a customer care agent to reply to each of the second messages received from a second customer. Post determining the first response time, the ALU may determine a first average response time for each conversation based on at least the first response time associated with the second messages in each conversation. For example, a conversation comprises four messages (a second customer has received each message from a customer care agent). The timestamp associated with the four messages are 12.10 PM, 12.20 PM, 12.25 PM, and 12.38 PM. The second customer has replied to each of the four messages at 12.13 PM, 12.22 PM, 12.28 PM, and 12.39 PM. Therefore, the first response time associated with each of the four messages are 3 minutes, 2 minutes, 3 minutes, and 1 minute. The first average response time of the conversation comprising the four messages is 2.25 minutes (i.e., $$\left(\text{i.e., } \frac{3+2+3+1}{4} = 2.25\right).$$

Similarly, the ALU may determine a second average response time for each conversation based on at least the second response time associated with the second messages in each conversation. The ALU may utilize codes/programs/algorithms/scripts stored in the memory to determine the first response time, the second response time, the first average response time, and the second average response time. Further, the processor may utilize the first average response time and the second average response time associated with each of the historical conversations to determine the priority of each conversation. The processor may refer to a predefined set of rules to assign priority to the conversations based on the first average response time and the second average response time. The predefined set of rules may have defined range of first average response time and the second average response time for each priority type. For example, if the first average response time is 2.25 minutes and the second average response time is 3 minutes, priority of the conversation is "high".

The agents may consider the first average response time and the second average response time associated with each conversation to assign the priority to each of the historical conversations.

At step 306, the combinations of the features are determined. The combinations of the features correspond to the first categories. The processor may determine the first categories based on the features extracted from each of the historical conversations. Further, the first categories may include all the possible permutations of the features.

A person having ordinary skill in the art would understand that the combination of the features correspond to combinations of the feature values. For example, the features values extracted from the conversations as discussed above (refer Table 1) are influence(high), influence(medium), influence (low), location-1, location-2, topic-1, and topic-2. The processor may determine the combinations of the features (i.e., the first categories) based on the extracted feature values as shown in Table 2. For example, a first combination, C1 is determined based on the extracted features (e.g., influence (high), location-1, and topic-1) as shown in Table 2.

TABLE 2

An example of combinations of features

| Combination (First category) | Associated Features |
|---|---|
| First combination, C1 | influence(high) + location-1 + topic-1 |
| Second combination, C2 | Influence(high) + location-2 + topic-2 |
| Third combination, C3 | Influence(medium) + location-2 + topic-1 |
| Fourth combination, C4 | Influence(high) + location-1 + topic-2 |
| Fifth combination, C5 | Influence(low) + location-1 + topic-1 |
| Sixth combination, C6 | Influence(low) + location-2 + topic-2 |
| Seventh combination, C7 | Influence(low) + location-2 + topic-1 |
| Eight combination, C8 | Influence(medium) + location-1 + topic-2 |

At step 308, the count of conversations for each combination of the features is determined. As the combinations of the features correspond to the first categories, the processor may determine the count of conversations for each of the first categories. The processor may categorize each of the conversations in the first categories based on the combination of the features associated with the respective conversations. For example, features extracted from a conversation is influence (low), location-2, and topic-1, the processor may categorize the conversation in the first category corresponding to the combination C7 (refer Table 2). Each of the first categories may comprise the first set of conversations. Post categorization, the counter determines the count of the conversations in each of the first categories, therefore determining the count of conversations for each of the combinations of the features. Following table (i.e., Table 3) illustrates a count of the conversations in each of the first categories (i.e., feature combinations).

TABLE 3

An example of count of conversations in combinations

| Combination (First Category) | Count of conversations |
|---|---|
| C1 | 12 |
| C2 | 8 |
| C3 | 9 |
| C4 | 15 |
| C5 | 16 |
| C6 | 13 |
| C7 | 11 |
| C8 | 16 |

The first set of conversations in each of the first categories is further categorized into the second categories. The first set of conversations is categorized into the second categories based on the predefined priority associated with each conversation in the first set of conversations. For example, there are 100 conversations and each of the 100 conversations have a predefined priority such as a high priority, a medium priority, a low priority, and a spam priority. In such a case, the processor may categorize the first set of conversations in each of the first category into second categories namely high, medium, low, and spam. Further, the processor may be configured to utilize the counter to determine the count of conversations in each of the second categories.

TABLE 4

An example of second categories and count of conversations in each second category

| Combination (first category) | Count of conversations in combination | Count of conversations in second categories | | | |
|---|---|---|---|---|---|
| | | High | Medium | Low | Spam |
| C1 | 12 | 5 | 2 | 3 | 2 |
| C2 | 8 | 2 | 2 | 0 | 4 |
| C3 | 9 | 2 | 4 | 1 | 2 |
| C4 | 15 | 6 | 5 | 3 | 1 |
| C5 | 16 | 1 | 2 | 12 | 1 |
| C6 | 13 | 10 | 1 | 1 | 1 |
| C7 | 11 | 4 | 2 | 3 | 2 |
| C8 | 16 | 3 | 9 | 1 | 3 |

At step 310, the priority of each combination is determined. As each combination of the features corresponds to a first category, the processor may determine the priority of each first category based on at least the count of the conversations under each of the second categories. The processor determines the count of conversations in each second category (refer Table 4) corresponding to each first category. The processor identifies the second category with maximum number of conversations. Thereafter, the processor may assign the priority to the first categories as the priority represented/indicated by the second category having maximum number of conversations. For example, the combination C1 is assigned a high priority as the count of conversations is maximum under the high category (i.e., 5) as compared to other categories (i.e., medium (2), low (3), and spam (2)) in the first category C1. Similarly, the processor may assign the priority to each of the combinations (e.g., C2, C3, C4, C5, C6, C7, and C8) as shown in Table 5.

TABLE 5

Priority of combinations of features

| Combination (First category) | Priority of combination | Count of conversations in second categories | | | |
|---|---|---|---|---|---|
| | | High | Medium | Low | Spam |
| C1 | High | 5 | 2 | 3 | 2 |
| C2 | Spam | 2 | 2 | 0 | 4 |
| C3 | Medium | 2 | 4 | 1 | 2 |
| C4 | High | 6 | 5 | 3 | 1 |
| C5 | Low | 1 | 2 | 12 | 1 |
| C6 | High | 10 | 1 | 1 | 1 |
| C7 | High | 4 | 2 | 3 | 2 |
| C8 | Medium | 3 | 9 | 1 | 3 |

In a scenario, two of the second categories may have same count of conversations and the count is maximum among the count of conversations in each of the second categories. In such a scenario, the processor may select a second category randomly from the two second categories. Thereafter, the processor may assign the priority to the first category by assigning the priority represented by the randomly selected second category. The processor may select a second category, which has higher priority among the two or more second categories (for same count of conversations and the count is maximum among the count of conversations in each of the second categories). For example, there is a second category with a high priority and a second category with a medium priority. These two second categories have same count of conversations and the count is maximum among the count of conversations in each of the second categories. In such a scenario, the processor may select the second category with the high priority and further assign the high priority to the first category.

A person having ordinary skill in the art would understand that the scope of this disclosure is not limited to selecting the second category having the highest priority. The second category with lowest priority (among the second categories having same count of conversations) may be selected. Accordingly, the combination of the features (i.e., the first category) is assigned the priority.

At step 312, the first set of rules is generated based on at least the priority of each combination. The processor may generate/determine the first set of rules based on a continuous learning of the training data. The training data is continuously updated with the historical conversations. The training data may comprise at least of the features extracted from each of the historical conversations, the combinations of the extracted features (i.e., the first categories), the determined priority of each of the first categories, the first average response time, the second average response time, and the previous conversation history of the customers (e.g., first customer, second customer, customer care agents, etc.). The first set of rules comprises rules that are utilized in conjunction with the predefined rules to assign the priority to the incoming message (i.e., the first message). For example, assign a same priority to an incoming message as that of a combination (e.g., C1), when the combination of the first features extracted from the incoming message is same as that of the combination C1.

At step 314, the predefined rules are updated with at least the first set of rules. The processor may extract the predefined rules from the database server or the memory. Thereafter, the processor may update the predefined rules with at least the determined first set of rules. The predefined rules are updated with the first set of rules so as to improve the accuracy of assigning the priority to the first message.

At step 316, the priority is assigned to the first message (i.e., the incoming message) from the first customer. The processor may utilize the updated predefined rules to assign the priority to the first message from the first customer. After receiving the first message, the processor may extract the first features from the first message. Thereafter, the processor may determine the combination of the first features extracted from the first message. Further, the processor may utilize the updated predefined rules to assign/predict the priority to the first message. For example, a first message is received from a first customer. The processor extracts first features from the first message. The extracted first features of the first message are influence(medium), location-2, and topic-1. The combination of the first features is determined as influence(medium)+location-2+topic-1. The processor utilizes the updated predefined rules to determine that the combination of the first message corresponds to the combination, C3. Therefore, the processor may assign a medium priority to the first message.

At step 316, the assigned priority of the first message is displayed to the agents. The processor may present the user interface on the display screen of the agent computing device displaying the assigned priority of the first message. The agents may transmit responses corresponding to the first message based on the assigned priority of the first message. The agents may change the priority of the first message from the first customer based on at least the location and influence of the first customer, topic and content of the conversation comprising the first message, previous conversation history of the first customer, and details of the first customer.

Block Diagram for Assigning Priority to First Message

Figure 4:
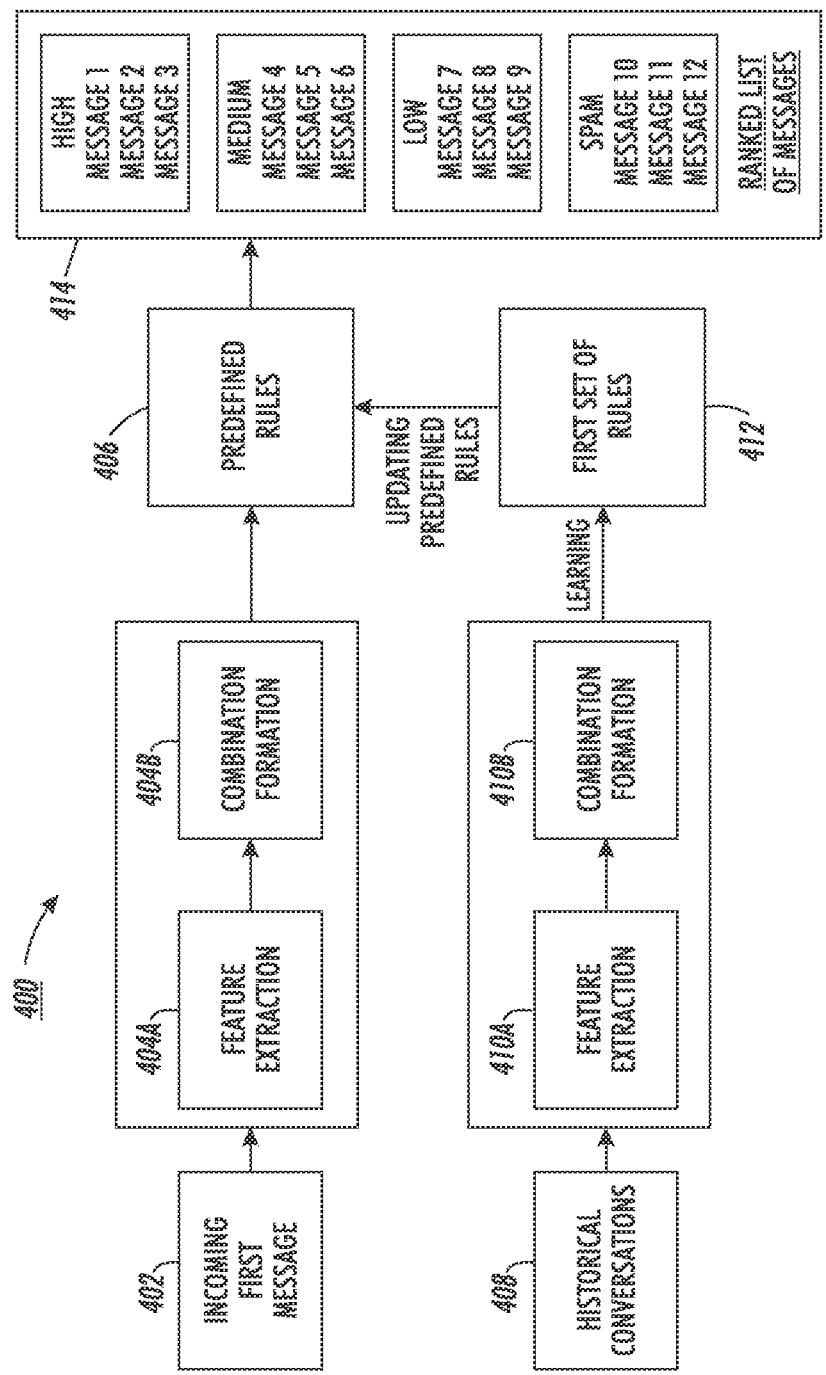
FIG. 4 is a block diagram that illustrates a flow diagram for assigning a priority to a first message from a first customer in a social CRM environment.

FIG. 4 is a block diagram that illustrates a flow diagram for assigning the priority to the first message from the first customer in the social CRM environment. The block diagram 400 is described in conjunction with FIG. 1, FIG. 2 and FIG. 3.

Post receiving the first message (depicted by 402), the processor may extract the historical conversations (depicted by 408) from the database server. Thereafter, the processor may extract the features (depicted by 410A) from each of the historical conversations. The features may comprise location, influence, topic, and predefined priority. Further, the processor may determine the combinations (depicted by 410B) comprising the extracted features (depicted by 410A). The processor assigns the priority to each combination (i.e., each first category) based on at least the count of conversations under each of the second categories associated with each of the categories. Thereafter, the processor utilizes the training data to determine the first set of rules (depicted by 412). The training data may comprise at least of the features extracted from each of the historical conversations, the combinations of the extracted features (i.e., the first categories), and the determined priority of each of the first categories.

Post determining the first set of rules, the processor may update the predefined rules with the first set of rules. The processor may determine the first features of the first message (depicted by 404A). Thereafter, the processor may determine the combination of the first features of the first message (depicted by 404B).

Further, the processor may utilize the updated predefined rules to predict/assign the priority to the first message. Similarly, the processor may assign the priority (high, medium, low, or spam) to each of the first messages (i.e. the incoming messages). The processor may present the user interface displaying a ranked list of messages (depicted by 414) to the agents. The first messages in the ranked list of messages may be displayed based on at least the assigned priorities (depicted by 414). The first messages in the ranked list of messages may be categorized into priorities (i.e., high, medium, low, or spam as depicted in 414).

Graphical User Interface (GUI) for Displaying Ranked List

Figure 5A:
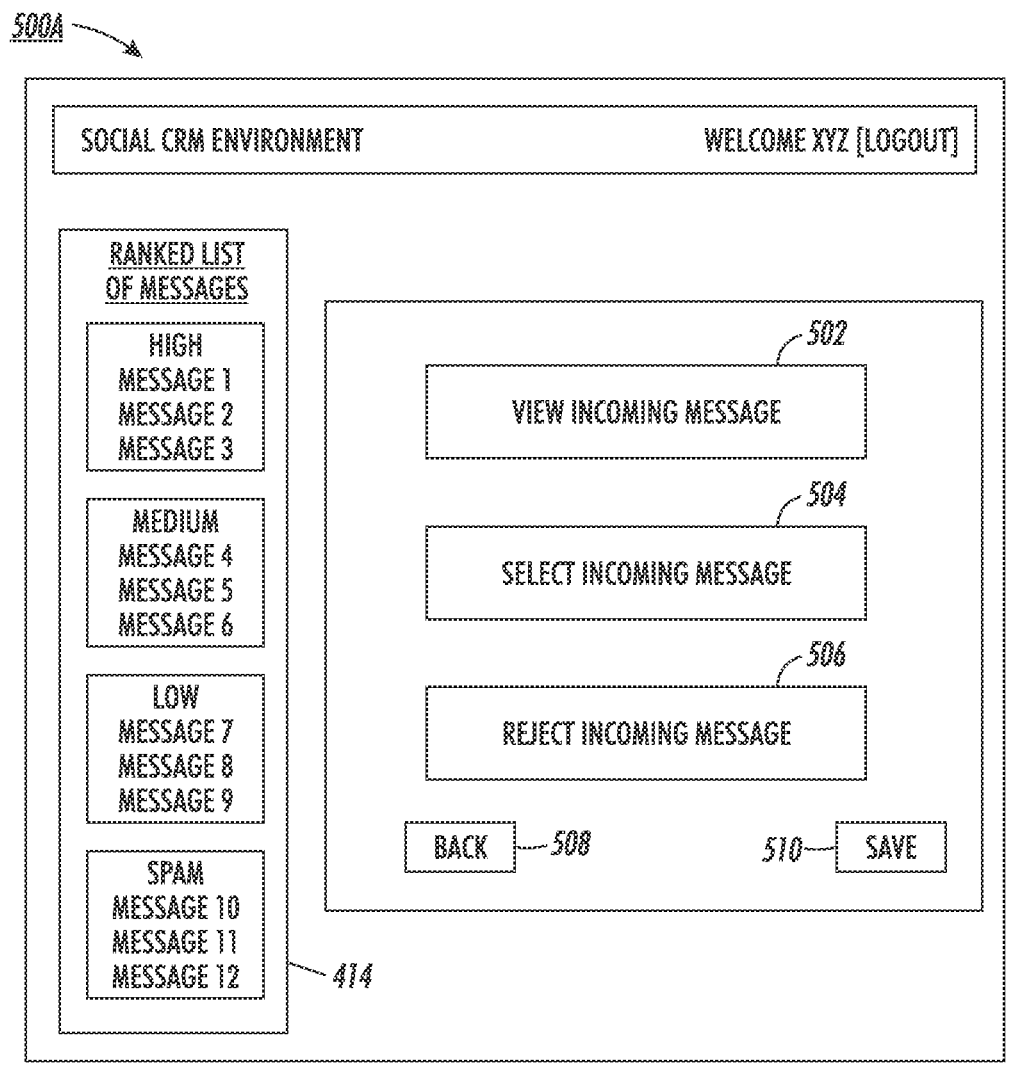
FIG. 5A is a block diagram illustrating a graphical user interface (GUI) displaying a ranked list of messages to one or more agents.

FIG. 5A is a block diagram illustrating a GUI 500A displaying the ranked list of messages to the agents. The GUI 500A may be displayed on the display screen of a computing device such as the agent computing device. An agent, from the agents, may log into a social CRM environment system using his/her user id and password. The processor may present the GUI 500A to one of the agent, when the agent has logged in. The agent may utilize the GUI 500A to view, select, and reject the incoming message (i.e., the first message) using tabs such as a view incoming message tab 502, a select incoming message tab 504, and a reject incoming message tab 506. The processor may display the ranked list of messages 414, when the agent clicks on the view incoming message tab. The processor may enable the agent to select at least one incoming message from the ranked list of messages, when the agent clicks on the select incoming message tab 504. The agent may reject the incoming messages, when the agent clicks on the reject incoming message tab. The agent may click on a save tab 510 to save any of the changes that he/she have made on the GUI 500A.

Figure 5B:
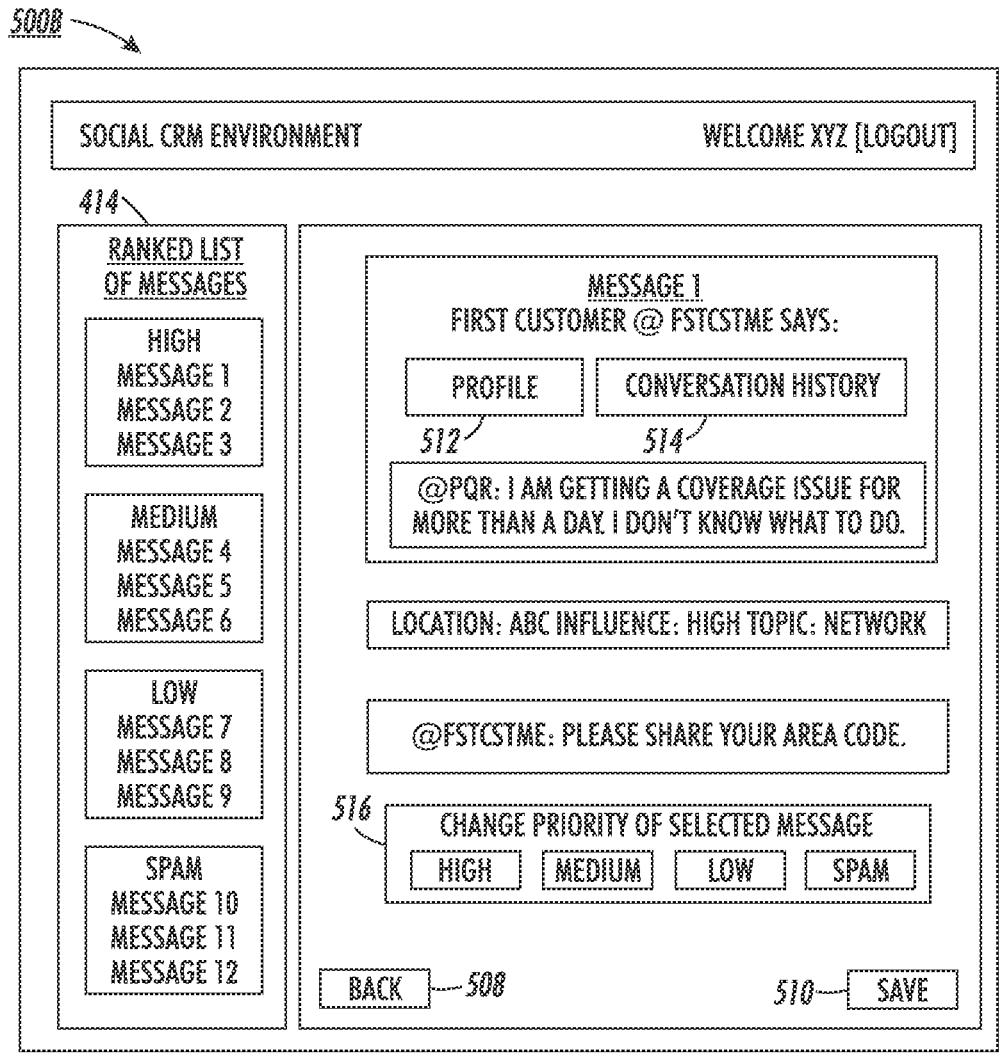
FIG. 5B is a block diagram illustrating a GUI displaying a selected incoming message.

Post clicking on the select incoming message tab, the processor enables the agent to select the incoming message from the ranked list of messages. The processor may present a GUI 500B to the agent displaying the selected incoming message as shown in FIG. 5B, when the agent selects the incoming message from the ranked list of messages. For example, the agent selects an incoming message from the ranked list of messages such as a message 1 from a first customer. Thereafter, the processor present the GUI 500B displaying the message 1 from the first customer. The agent may utilize the GUI 500B to transmit responses corresponding to the queries from the first customer. The agent may click on a profile tab 512 to view the profile of the first customer. The agent may click on a conversation history tab 514 to view previous conversation history of the first customer. The agent may click on a change priority of selected message tab 516 to change the priority of the conversation comprising the selected message from the first customer. The processor may assign the priority to the conversation comprising the first message by assigning the priority represented by the first message, when the agent has not changed the priority of the first message. Post-closing of the conversation comprising the first message, the processor may update the historical conversations with the conversation comprising the first message. Thereafter, the processor may repeat the process as discussed above (refer FIG. 3) to assign a priority to another incoming message. The agent may click on a save tab to save any of the changes that he/she have made on the GUI 500B. Further, the agent may click on a back tab to go back to a previous interface.

Various embodiments hereof are directed to a method and a system for assigning a priority to an incoming message from a customer. The method utilizes the historical conversations and the predefined priorities associated with each of the conversation in the historical conversations to determine a first set of rules. The disclosed method further utilizes the first set of rules (i.e., the dynamic workflow rules) to update the predefined rules (i.e., the static workflow rules). The predefined rules are updated with the first set of rules so as to improve the accuracy of assigning the priority to the incoming message. Further, the disclosed method assigns the priority to the incoming message from the customer based on at least the updated predefined rules. The disclosed method helps one or more agents reduce their time spent on identifying important incoming messages in a social CRM environment. The disclosed method enables CRM businesses to effectively configure and adjust their workflow rules whenever needed without doing them manually.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method hereof. The systems and methods described can also be implemented using only software programming, only hardware, or a varying combination of the two techniques. The teachings hereof are independent of the programming language and the operating system used in the computers. The instructions can be written in all programming languages including "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The teachings hereof can also be implemented in various operating systems and platforms, including "Unix," "DOS," "Android," "Symbian," and "Linux."

The programmable instructions can be stored and transmitted on a computer-readable medium and can also be embodied in a computer program product comprising a computer-readable medium, with any product capable of implementing the above methods and systems, or the numerous possible variations thereof.

Various embodiments of the methods and systems for assigning a priority to an incoming message from a customer have been disclosed. However, it should be apparent to those skilled in the art that modifications, in addition to those described, are possible without departing from the inventive concepts herein. The embodiments, therefore are not restrictive. Moreover, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A computer implemented method for assigning a priority to a first message from a first customer to help customer care agents prioritize a response to that incoming message in a social customer relationship management (CRM) environment, said computer implemented method comprising:

retrieving, from a central storage system, historical conversations between second customers and customer care agents, each of said conversations comprising at least one second message, each of said conversations having associated features at least comprising a topic associated with each conversation, a sentiment of said conversation, a location of said second customer, and a social media influence of said second customer, each of said second conversations having an assigned priority;

determining combinations of features associated with said second conversations, each of said combinations being a first category;

categorizing each of said second conversations into one of said first categories based on features associated with each of said second conversations;

assigning a priority to each of said first categories based on a cumulative priority of all said second conversation categorized in said first category;

receiving a first message from a first customer's computing device;

determining which of said first categories said first conversation belongs based on features of said first conversation;

assigning, to said first conversation, a priority of said first category to which said first conversation belongs; and displaying, on a customer care agent's display device, the priority assigned to said first message so that said agent can prioritize their response to said first message based on said displayed priority.

2. The computer implemented method of claim 1, wherein a priority of said second conversation is a cumulative priority of priorities of second messages in said second conversation.

3. The computer implemented method of claim 1, wherein said central storage system is any of: a file system, a work log, a cloud system, a social networking platform, an application server, and a database server.

4. The computer implemented method of claim 1, wherein said priority is based on a response time by a customer care agent to at least one second message in said second conversation.

5. The computer implemented method of claim 1, wherein the first message received from a first customer's computing device is one of an instant message, an electronic mail, a voice mail, a text message, and a message corresponding to a query/problem, said first message being a first conversation.

6. A system for assigning a priority to a first message from a first customer to help customer care agents prioritize a response to that incoming message in a social customer relationship management (CRM) environment, said system comprising:
  a central storage system; and
  a processor executing machine readable program instruction to perform:
    retrieving, from said central storage system, historical conversations between second customers and customer care agents, each of said conversations comprising at least one second message, each of said conversations having associated features at least comprising a topic associated with each conversation, a sentiment of said conversation, a location of said second customer, and a social media influence of said second customer, each of said second conversations having an assigned priority;
    determining combinations of features associated with said second conversations, each of said combinations being a first category;
    categorizing each of said second conversations into one of said first categories based on features associated with each of said second conversations;
    assigning a priority to each of said first categories based on a cumulative priority of all said second conversation categorized in said first category;
    receiving a first message from a first customer's computing device;
    determining which of said first categories said first conversation belongs based on features of said first conversation;
    assigning, to said first conversation, a priority of said first category to which said first conversation belongs; and
    displaying, on a customer care agent's display device, the priority assigned to said first message so that said agent can prioritize their response to said first message based on said displayed priority.

7. The system of claim 6, wherein a priority of said second conversation is a cumulative priority of priorities of second messages in said second conversation.

8. The system of claim 6, wherein said central storage system is any of: a file system, a work log, a cloud system, a social networking platform, an application server, and a database server.

9. The system of claim 6, wherein said priority is based on a response time by a customer care agent to at least one second message in said second conversation.

10. The system of claim 6, wherein the first message received from a first customer's computing device is one of an instant message, an electronic mail, a voice mail, a text message, and a message corresponding to a query/problem, said first message being a first conversation.

* * * * *